(12) United States Patent
Tsuji

(10) Patent No.: US 6,557,418 B2
(45) Date of Patent: May 6, 2003

(54) PORTABLE PRESSURE MEASURING APPARATUS

(75) Inventor: Tomoharu Tsuji, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/915,427

(22) Filed: Jul. 26, 2001

(65) Prior Publication Data

US 2002/0016694 A1 Feb. 7, 2002

(51) Int. Cl.[7] .............................................. G01L 9/00
(52) U.S. Cl. .................................................... 73/723
(58) Field of Search ........................ 73/384, 861, 753, 73/723; 244/142; 702/50, 91, 138

(56) References Cited

U.S. PATENT DOCUMENTS 4,835,716 A * 5/1989 Tamaki et al. ............... 364/558

* cited by examiner

*Primary Examiner*—Max Noori
*Assistant Examiner*—Marissa Ferguson
(74) *Attorney, Agent, or Firm*—Adams & Wilks

(57) ABSTRACT

It is an object of the present invention to provide a portable pressure measuring apparatus to be used as an altimeter, which can be automatically switched to an optimum sampling period in accordance with a use of the apparatus before a pressure measurement at all times. A portable pressure measuring apparatus additionally comprises a pressure/altitude operation section for obtaining an altitude from a measured pressure by an arithmetic operation, a rate of pressure change operation section, and a movement detecting section, wherein, if the movement detecting section detects a movement, a pressure is measured in a sampling period, for example, in a 1-second sampling period, if a rate of altitude change is equal to or greater than a threshold or in a sampling period, for example, in a 5-second sampling period, if the rate of altitude change is smaller than the threshold and wherein, unless the movement detecting section detects any movement, the pressure sampling measurement is not performed.

13 Claims, 16 Drawing Sheets

PORTABLE PRESSURE MEASURING APPARATUS

BACKGROUND OF THE INVENTION

1. Field of the Invention

The present invention relates to lowering power consumption of a portable pressure measuring apparatus for a pressure sampling measurement and a real-time altitude display.

2. Description of the Prior Art

In general, a portable pressure measuring apparatus used as an altimeter comprises at least a semiconductor pressure sensor for sampling and measuring a pressure at regular intervals, an operation control section for calculating an altitude by using a known pressure-altitude conversion formula, a display section for displaying the altitude, and a battery for supplying power to these components.

In the Japanese Utility Model Publication No. 5-11455, there is disclosed a portable pressure measuring apparatus which can be used in both a bathometer and an altimeter, comprising at least a semiconductor pressure sensor, a control section, and a display section, wherein a sampling period for a pressure measurement can be switched to suppress power consumption of the semiconductor pressure sensor. More specifically, a sampling measurement is performed for a pressure measurement only for a certain period of time in the 1-second period at measuring the water depth, while a sampling measurement is performed in the 1-second period immediately after starting an altitude measurement and afterward in the 1-minute period at measuring the altitude; in case of a significant altitude change, the sampling measurement is performed in the 1-second period for a certain period of time for each so as to lower the power consumption.

In this conventional portable pressure measuring apparatus, the water depth measurement and the altitude measurement are manually switched to each other by key inputs. In addition, it is determined automatically by the control section whether the altitude change is significant. More specifically, the control section compares the latest altitude data with altitude data obtained one minute before and determines the altitude change to be significant if the difference between them exceeds a threshold.

In short, after an elapse of a certain time period after starting the altitude measurement, the conventional portable pressure measuring apparatus measures a pressure in the 1-minute sampling period unless the altitude change is significant or in the 1-second sampling period if the altitude change is significant and these sampling periods are automatically switched to each other with measuring the rate of altitude change per minute, thereby concurrently achieving a real-time altitude display and low power consumption.

The conventional portable pressure measuring apparatus, however, has only two kinds of carriage sampling periods such as 1-minute and 1-second periods, and therefore they cannot be optimum carriage sampling periods for use in skydiving, skiing, mountain climbing, and the like. In this connection, normal carriage sampling periods for skydiving, skiing, and mountain climbing are 100 milliseconds, 100 milliseconds to 1 second, and 1 minute, respectively, for the portable pressure measuring apparatus. Therefore, the conventional portable pressure measuring apparatus has a problem that it is still unsatisfactory for Concurrently achieving the low power consumption and the real-time altitude display.

Furthermore, in the conventional portable pressure measuring apparatus, a user manually performs switching operations between the water depth measurement and the altitude measurement by means of key inputs and the user manually terminates the measurement by key inputs after the use of the apparatus though it is not specifically indicated. Therefore, the user may forget to make a key input for terminating the measurement; if so, the measurement mode continues, thereby causing a problem of wasteful power consumption.

SUMMARY OF THE INVENTION

To solve these problems, the present invention is provided. It is an object of the present invention to provide a portable pressure measuring apparatus to be used as an altimeter, which can be automatically switched to an optimum sampling period in accordance with a use of the apparatus before a pressure measurement at all times.

Taking into consideration that a portable pressure measuring apparatus is used for various uses, sampling periods coping with various rates of altitude change are preset so that the current sampling period is automatically switched to another whenever the rate of altitude change exceeds a threshold so as to perform a pressure measurement in the optimum sampling period. Furthermore, to prevent the portable pressure measuring apparatus from consuming wasteful power during no movement, the pressure is not measured at all or is measured in a very long sampling period during no movement.

More specifically, according to an aspect, the present invention which achieves the above object relates to a portable pressure measuring apparatus for a pressure sampling measurement and a real-time altitude display, comprising movement detection means, wherein a pressure is measured in a first (or movement) sampling period suitable for real-time display if the movement detection means detects a movement and the pressure is not measured when the movement detection means detects no movement.

According to another aspect, the present invention which achieves the above object relates to a portable pressure measuring apparatus for a pressure sampling measurement and a real-time altitude display, comprising movement detection means, wherein a pressure is measured in a first (or movement) sampling period suitable for the real-time display if the movement detection means detects a movement or in a second (or non-movement) sampling period which is longer than the movement sampling period when the movement detection means does not detect any movement.

According to still another aspect, the present invention which achieves the above problem relates to a portable pressure measuring apparatus for a pressure sampling measurement and a real-time altitude display, comprising rate of altitude change operation means and means for setting N−1 thresholds from the maximum threshold to the minimum threshold, wherein a pressure is measured in the Nth sampling period which is the minimum period if the rate of altitude change is equal to or greater than the maximum threshold, in the 1st sampling period which is the maximum period if the rate of altitude change is smaller than the minimum threshold, or in a sampling period having a length corresponding to respective thresholds if the rate of altitude change is between the maximum threshold and the minimum threshold. Then there is disclosed an embodiment in which the above N is assumed to be 3.

According to still another aspect, the present invention which achieves the above problem relates to a portable pressure measuring apparatus for a pressure sampling measurement and a real-time altitude display, comprising movement detection means, rate of altitude change operation means, and means for setting N−1 thresholds from the maximum threshold to the minimum threshold, wherein, if the movement detection means detects a movement, a pressure is measured in the Nth sampling period which is the minimum period if the rate of altitude change is equal to or greater than the maximum threshold, in the 1st sampling period which is the maximum period if the rate of altitude change is smaller than the minimum threshold, or in a sampling period having a length corresponding to respective thresholds if the rate of altitude change is between the maximum threshold and the minimum threshold and wherein, unless the movement detection means detects any movement, a pressure sampling measurement is not performed. Then there is disclosed an embodiment in which the above N is assumed to be 2.

Furthermore, according to another aspect, the present invention which achieves the above problem relates to a portable pressure measuring apparatus for a pressure sampling measurement and a real-time altitude display, comprising movement detection means, rate of altitude change operation means, and means for setting N−1 thresholds from the maximum threshold to the minimum threshold, wherein, if the movement detection means detects a movement, a pressure is measured in the Nth sampling period which is the minimum period if the rate of altitude change is equal to or greater than the maximum threshold, in the 1st sampling period which is the maximum period if the rate of altitude change is smaller than the minimum threshold, or in a sampling period having a length corresponding to respective thresholds if the rate of altitude change is between the maximum threshold and the minimum threshold and wherein, unless the movement detection means detects any movement, a pressure is measured in the non-movement sampling period longer than the maximum period. Then there is disclosed an embodiment in which the above N is assumed to be 2.

BRIEF DESCRIPTION OF THE SEVERAL VIEWS OF THE DRAWINGS

A preferred form of the present invention is illustrated in the accompanying drawings in which.

DETAILED DESCRIPTION OF THE PREFERRED EMBODIMENTS

Hereinafter, first to fifth embodiments of the present invention will now be described in order.

(First Embodiment)

Figure 1:
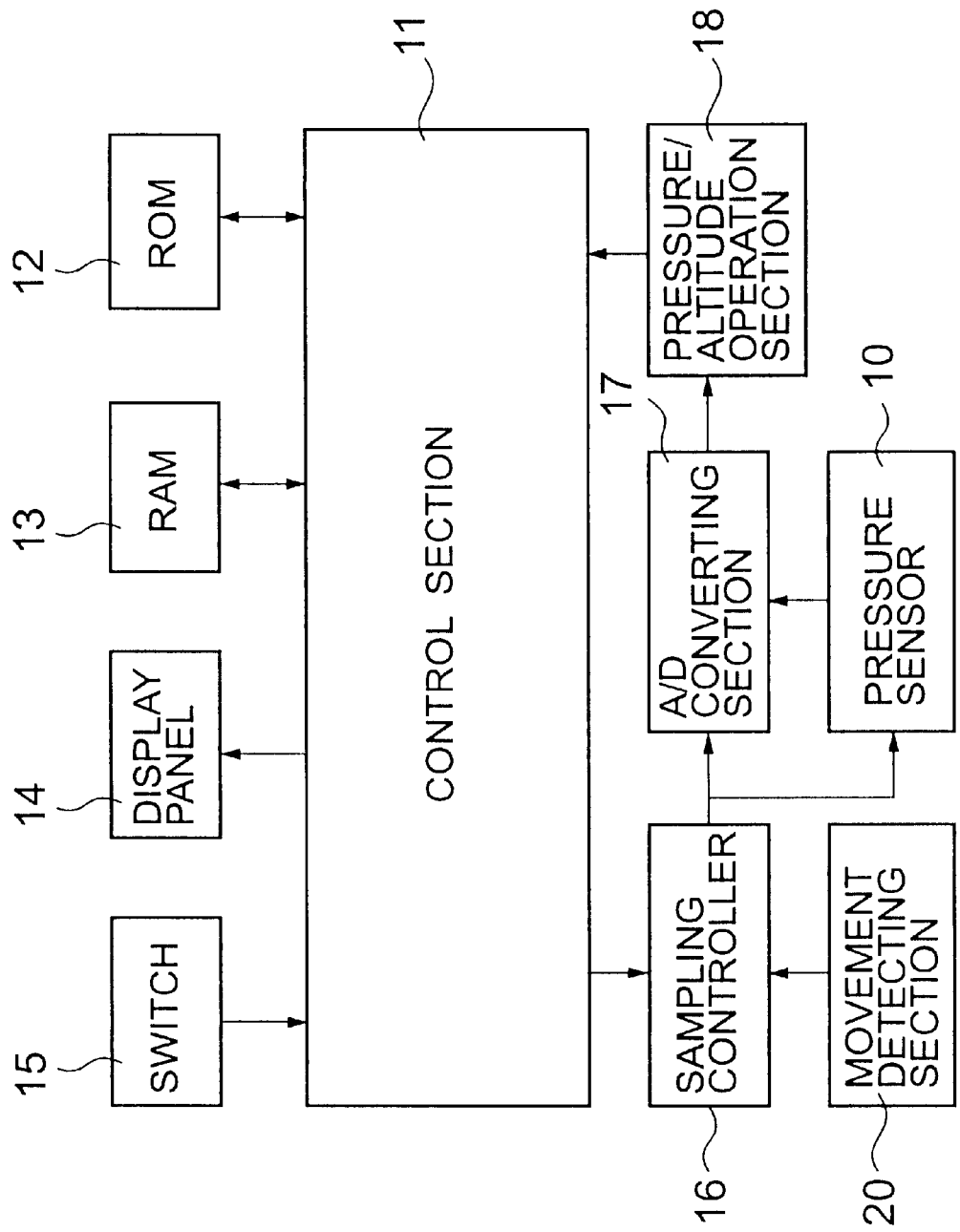
FIG. 1 is is a block diagram of a portable pressure measuring apparatus according to a first embodiment and a second embodiment of the present invention.
Figure 10:
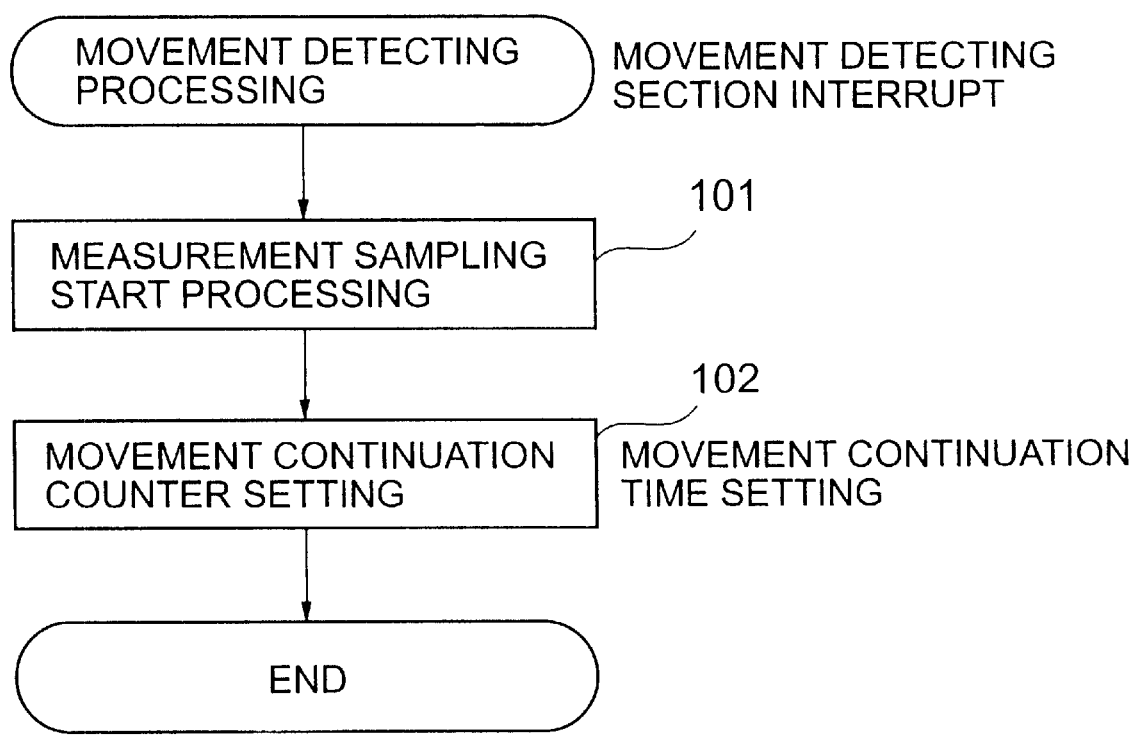
FIG. 10 is a flowchart of movement detecting processing in the portable pressure measuring apparatus according to the first embodiment.
Figure 11:
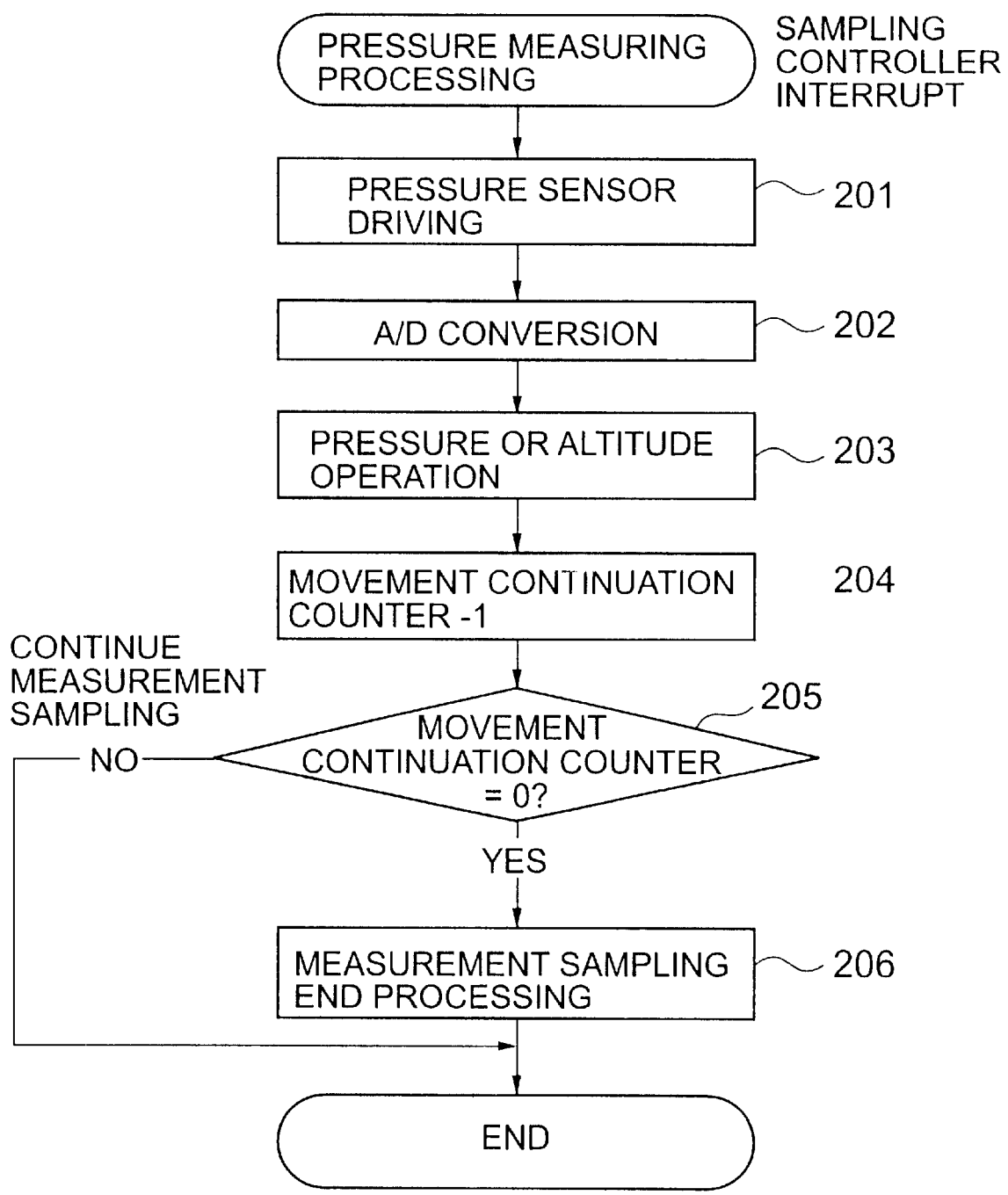
FIG. 11 is a diagram showing an example of a flowchart of pressure measuring processing in the portable pressure measuring apparatus according to the first embodiment.

A portable pressure measuring apparatus according to a first embodiment of the present invention, as shown in FIG. 1, comprises a pressure sensor 10, a control section 11 for performing various controls and arithmetic operations, a ROM 12 in which control programs are stored, a RAM 13 for storing various data, a display panel 14 for displaying an altitude or the like, switches 15 for various settings, a sampling controller 16 for driving the pressure sensor 10 in a predetermined sampling period, an A/D converting section 17 for converting an analog signal of the pressure sensor 10 to a digital signal, a pressure/altitude operation section 18 for obtaining an altitude from a measured pressure by an arithmetic operation, and a movement detecting section 20 such as an acceleration sensor, wherein a pressure is measured in accordance with flowcharts as shown in FIG. 10 and FIG. 11.

In other words, a movement detecting processing program in FIG. 10 is started upon a movement detecting section interrupt made by the movement detecting section 20. Then, the control section 11 performs measurement sampling start processing (101) and movement continuation counter setting (102) in order and then terminates a movement detecting processing program.

The above movement continuation counter is incorporated in the control section 11 and used for setting and managing a time duration during movement. For example, if a pressure measurement sampling period, namely, a carriage (or movement) sampling period is 1 min. and value 5 is set to the movement continuation counter, the movement continuation counter is set to 5 whenever movement detecting processing is performed.

A pressure measuring processing program in FIG. 11 is started upon a sampling controller interrupt made by the sampling controller 16. Then, the control section 11 causes the program to perform pressure sensor driving (201), A/D conversion (202), and pressure/altitude operation (203) processing in order. Subsequently to step 203, the control section 11 causes it to perform movement continuation counter 1 (204) processing. The movement continuation counter 1 is processing in which value 1 is subtracted from a set value of the movement continuation counter.

Subsequently to step 204, the control section 11 determines whether the movement continuation counter is 0 (205); if a result of the determination is YES, the control section 11 performs measurement sampling end processing (206) and then terminates the pressure measuring processing program. If the result in step 205 is NO, the measurement sampling is continued.

Figure 4:
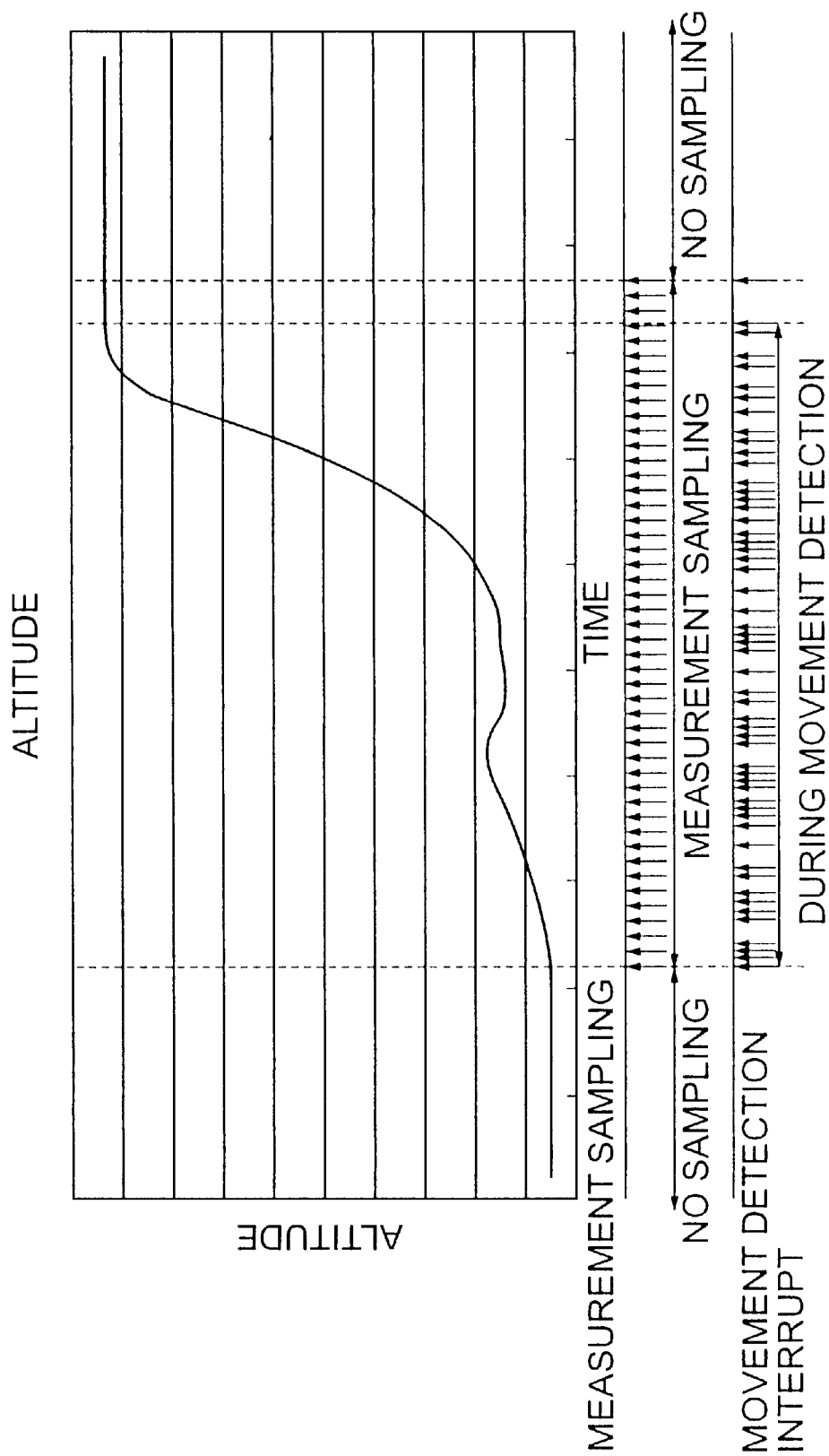
FIG. 4 is a diagram showing an example of a sampling period of the portable pressure measuring apparatus according to the first embodiment.

Referring to FIG. 4, there is shown a change of a sampling period when a user carrying the portable pressure measuring apparatus according to the first embodiment of the present invention moves from a level ground to an upland.

As apparent from FIG. 4, while a pressure is not measured at all before the user begins to move, the pressure is started to be measured in a predetermined carriage sampling period upon a movement detecting section interrupt made by the movement detecting section 20.

Then the movement continuation counter is reset to a predetermined value, for example, 5 whenever a movement detecting section interrupt is made. Therefore, processing is repeated from steps 101 to 102 of the flowchart in FIG. 10 and steps 201 to 204 of the flowchart in FIG. 11 while the user moves.

If the movement detecting processing is not performed any more, in other words, if the movement is terminated, the movement continuation counter is no longer reset, thereby validating only down-counting of the movement continuation counter in the pressure measuring processing and causing processing of subtracting value 1 from the set value on the movement continuation counter, namely, movement continuation counter 1 processing whenever the pressure measurement is performed. Therefore, if the movement is terminated, the set value on the movement counter becomes zero, in other words, the movement continuation counter=0 after the fifth movement continuation counter 1 processing and then measurement sampling end processing (206) is performed. If the carriage sampling period is 1 min. and the value on the movement continuation counter is set to 5, the pressure measurement is to be suspended 5 minutes after the movement end time.

(Second Embodiment)

Figure 12:
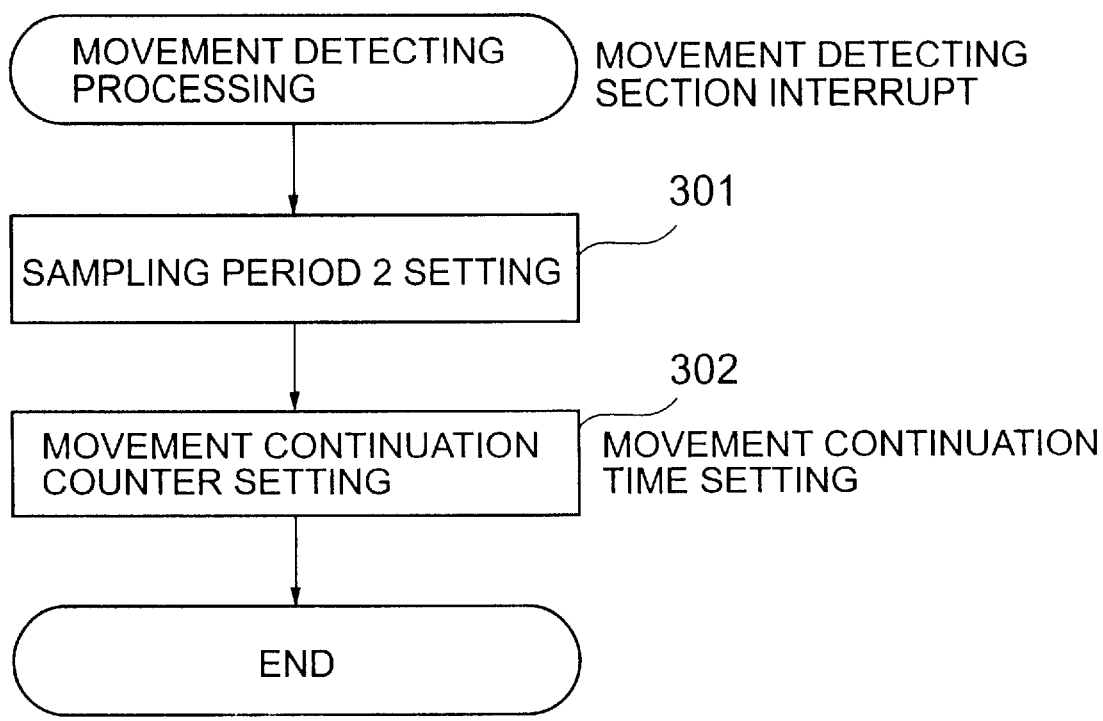
FIG. 12 is a diagram showing an example of a flowchart of movement detecting processing in the portable pressure measuring apparatus according to the second embodiment.
Figure 13:
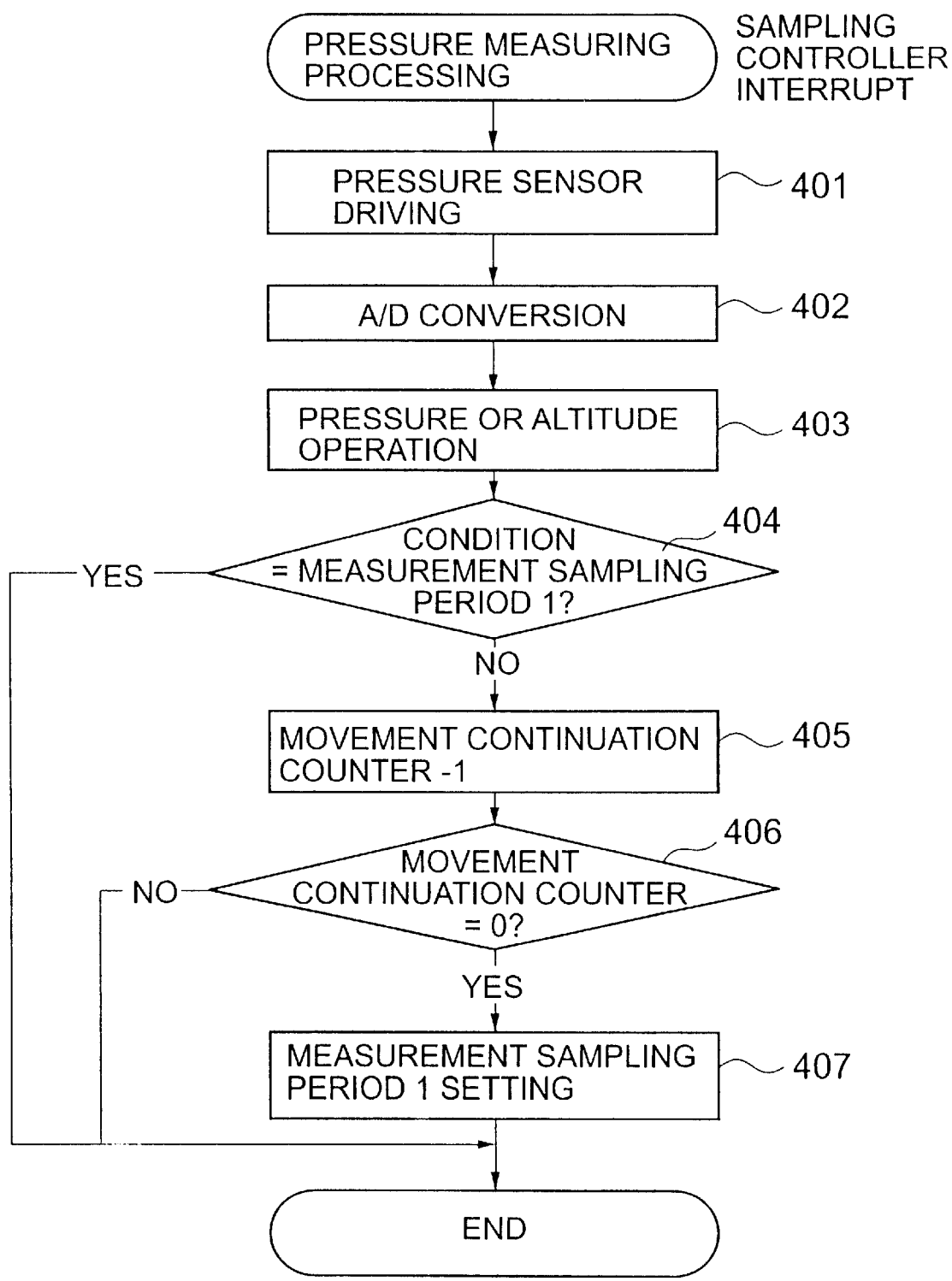
FIG. 13 is a diagram showing an example of a flowchart of pressure measuring processing in the portable pressure measuring apparatus according to the second embodiment.

A portable pressure measuring apparatus according to a second embodiment of the present invention comprises the same components as for the portable pressure measuring apparatus according to the first embodiment as shown in FIG. 1, wherein a pressure is measured in accordance with flowcharts as shown in FIG. 12 and FIG. 13.

More specifically, a movement detecting processing program shown in FIG. 12 is started upon a movement detecting section interrupt made by the movement detecting section 20. Then the control section 11 performs sampling period 2 setting (301) and movement continuation counter setting (302) processing in order and terminates the movement detecting processing program. The sampling period 2 is a carriage sampling period and is, for example, 1 minute.

The pressure measuring processing program in FIG. 13 is started upon a sampling controller interrupt made by the sampling controller 16. Then, the control section 11 causes it to perform pressure sensor driving (401), A/D conversion (402), and pressure/altitude operation (403) processing in order.

Subsequently, the control section 11 makes a determination on iCondition=Measurement sampling period 1i (404). More specifically it determines whether the current sampling period is sampling period 1. The sampling period 1 is, for example, 30 minutes.

If a result of the determination in step 404 is NO, processing of movement continuation counter 1 (405) is performed. If the result of the determination in step 404 is YES, the pressure measuring processing program is terminated.

Subsequently to step 405, the control section 11 determines whether the movement continuation counter is 0 (406). If a result of the determination in step 405 is YES, the control section 11 causes the sampling controller 16 to set the measurement sampling period 1 (407) to continue the measurement sampling in the sampling period 1. If the result of the determination in step 406 is NO, the control section 11 terminates the pressure measuring processing program.

Figure 5:
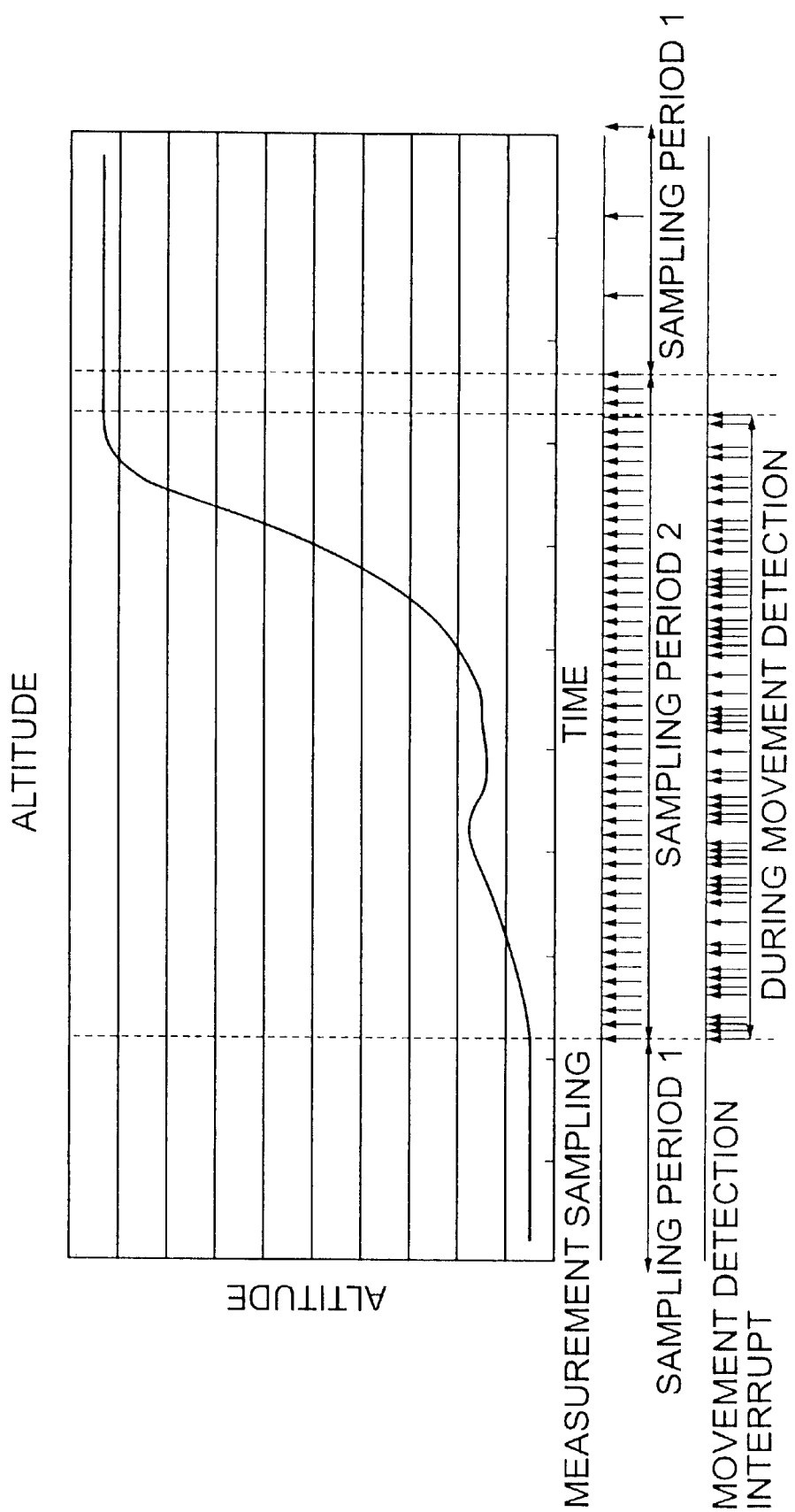
FIG. 5 is a diagram showing an example of a sampling period of the portable pressure measuring apparatus according to the second embodiment.

Referring to FIG. 5, there is shown a change of a sampling period when a user carrying the portable pressure measuring apparatus according to the second embodiment moves from a level ground to a higher altitude.

As apparent from FIG. 5, while the portable pressure measuring apparatus measures a pressure in a non-movement sampling period, namely, sampling 1 before the user begins to move, the pressure is started to be measured in a predetermined measurement sampling period, namely, sampling period 2 upon a movement detecting section interrupt made by the movement detecting section 20.

Then the movement continuation counter is reset to a predetermined value, for example, 5 whenever a movement detecting section interrupt is made. Therefore, processing is repeated from steps 301 to 302 of the flowchart in FIG. 12 and steps 401 to 405 of the flowchart in FIG. 13 while the user moves.

If the movement detecting processing is not performed any more, in other words, if the movement is terminated, the movement continuation counter is no longer reset, thereby validating only down-counting of the movement continuation counter in the pressure measuring processing and causing processing of subtracting value 1 from the set value on the movement continuation counter, namely, movement continuation counter 1 whenever the pressure measurement is performed. Therefore, if the movement is terminated, the set value on the movement counter becomes zero, in other words, the movement continuation counter=0 after the fifth movement continuation counter 1 processing and then sampling period 1, namely, measurement sampling at non-movement measurement sampling is performed. If the carriage sampling period which is sampling period 2 is 1 min. and the value on the movement continuation counter is set to 5, the pressure measurement is to shift from the sampling period 2 to the sampling period 1 which is the non-movement sampling period 5 minutes after the movement end time.

(Third Embodiment)

Figure 2:
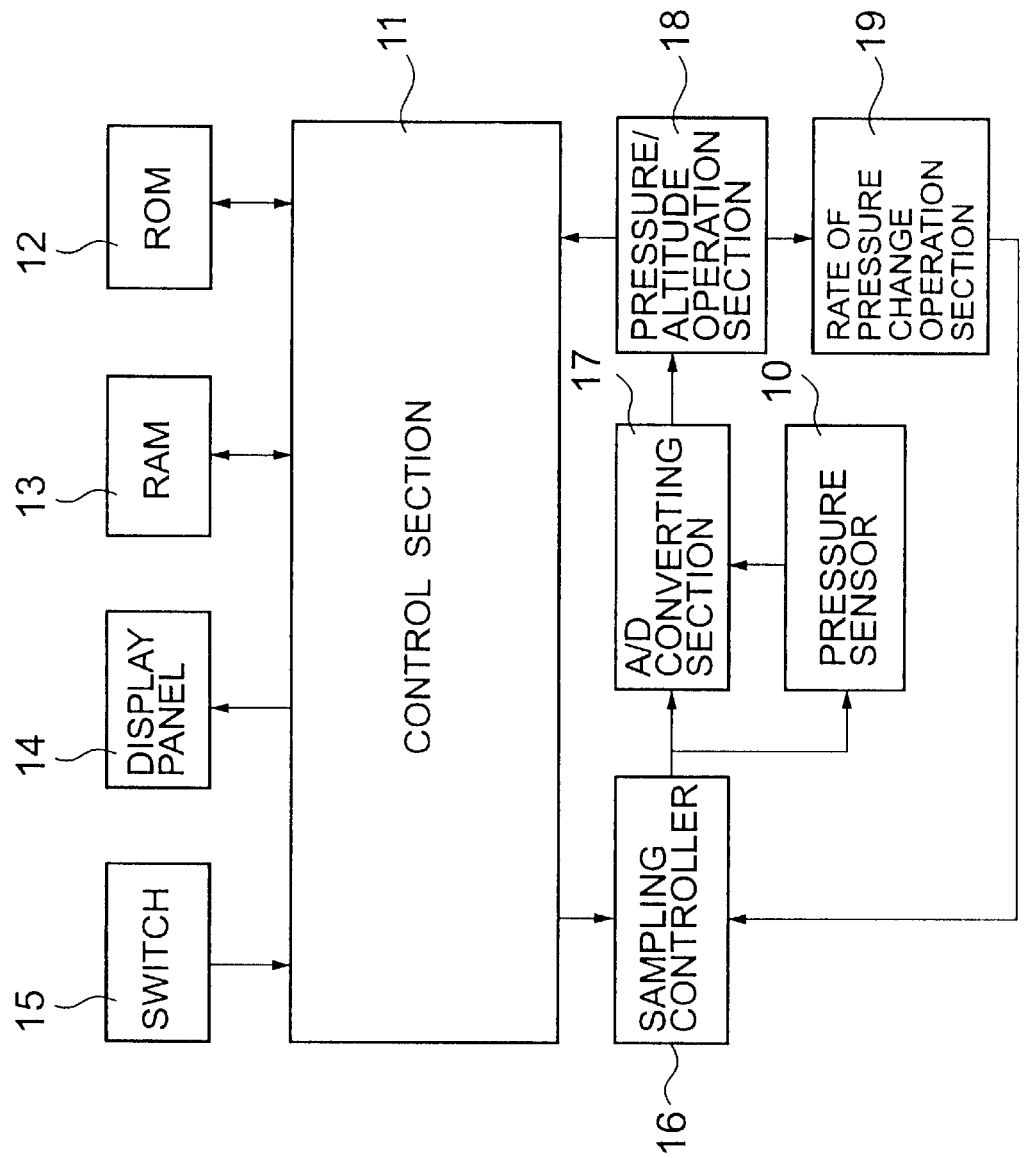
FIG. 2 is a block diagram of a portable pressure measuring apparatus according to a third embodiment of the present invention.
Figure 14:
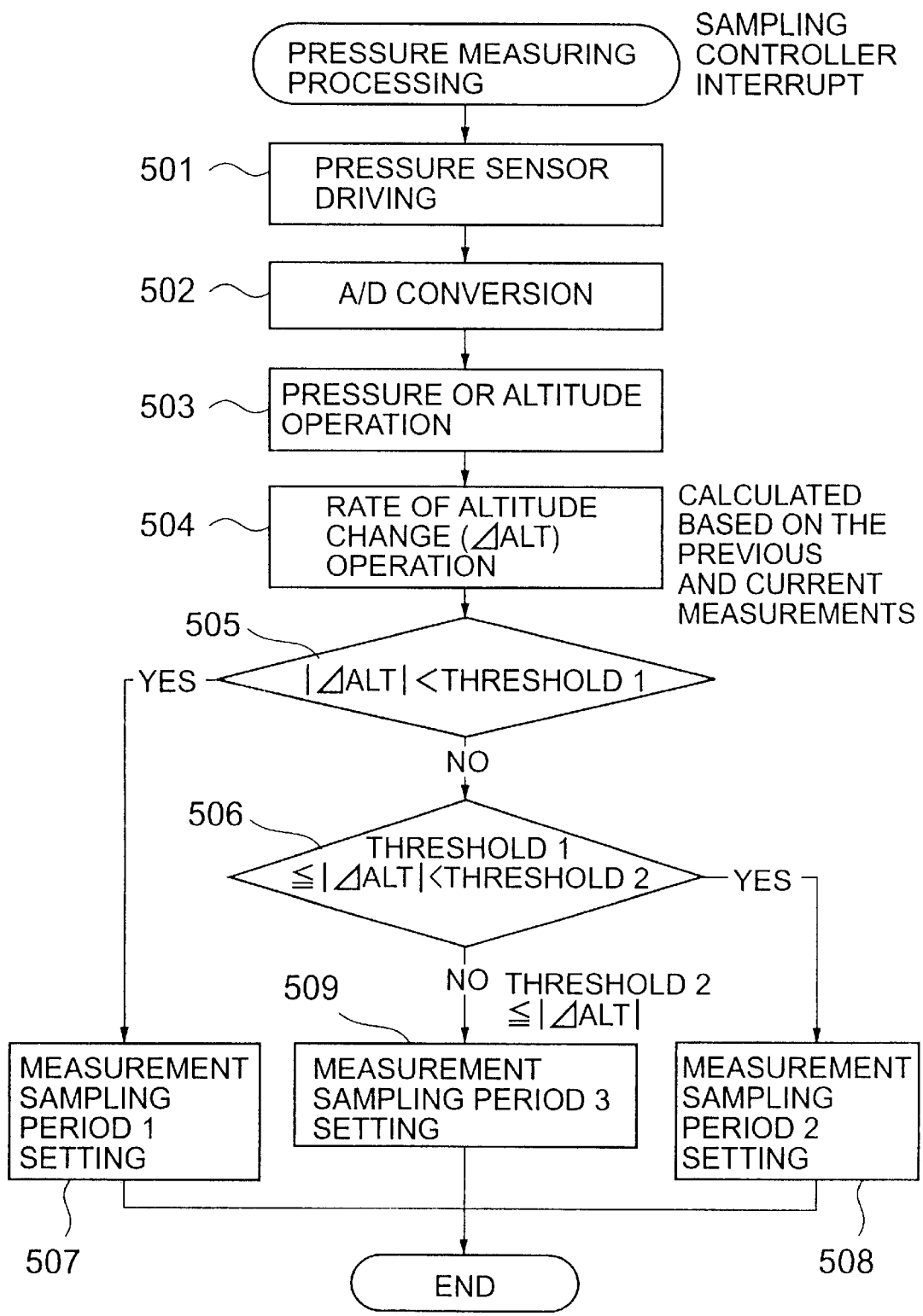
FIG. 14 is a diagram showing an example of a flowchart of pressure measuring processing in the portable pressure measuring apparatus according to the third embodiment.

A portable pressure measuring apparatus according to a third embodiment of the present invention, as shown in FIG. 2, comprises a pressure sensor 10, a control section 11 for performing various controls and arithmetic operations, a ROM 12 in which control programs are stored, a RAM 13 for storing various data, a display panel 14 for displaying an altitude or the like, switches 15 for various settings, a sampling controller 16 for driving the pressure sensor 10 in a predetermined sampling period, an A/D converting section 17 for converting an analog signal of the pressure sensor 10 to a digital signal, a pressure/altitude operation section 18 for obtaining an altitude from a measured pressure by an arithmetic operation, and a rate of pressure change operation section 19, wherein a pressure is measured in accordance with a flowchart as shown in FIG. 14.

In other words, a pressure measurement program is started upon a sampling controller interrupt signal transmitted from the sampling controller 16.

Then, the control section 11 causes the program to perform processing of pressure sensor driving (501), an A/D conversion (502), a pressure/altitude operation (503), and a rate of altitude change (hereinafter referred to as Δ ALT) operation (504) in order. A value of the ΔALT operation is obtained from the previous measurement and the current measurement.

Subsequent to step 504, the control section 11 determines whether an absolute value of ΔALT is smaller than threshold 1 (505). If a result of the determination in step 505 is YES, the control section 11 causes the sampling controller 16 to set a measurement sampling period 1 (507).

If the result of the determination in step 505 is NO, the control section 11 determines whether the absolute value of ΔALT is the threshold 1 or greater and smaller than threshold 2 (506).

If the result of the determination in step 506 is NO, in other words, if the absolute value of ΔALT is the threshold 2 or greater, the control section 11 causes the sampling controller 16 to set a measurement sampling period 3 (509).

The portable pressure measuring apparatus according to the third embodiment comprises rate of altitude change operation means and means for setting N−1 thresholds from the maximum threshold to the minimum threshold, wherein in an embodiment in which N is 3 a pressure is measured in the minimum sampling period 3 if the absolute value of ΔALT is equal to or greater than the maximum threshold (threshold 2), in the maximum sampling period 1 if the rate of altitude change is smaller than the minimum threshold (threshold 1), or in a sampling period 2 having a length between the maximum period and the minimum period if the rate of altitude change is between the maximum threshold and the minimum threshold.

Figure 6:
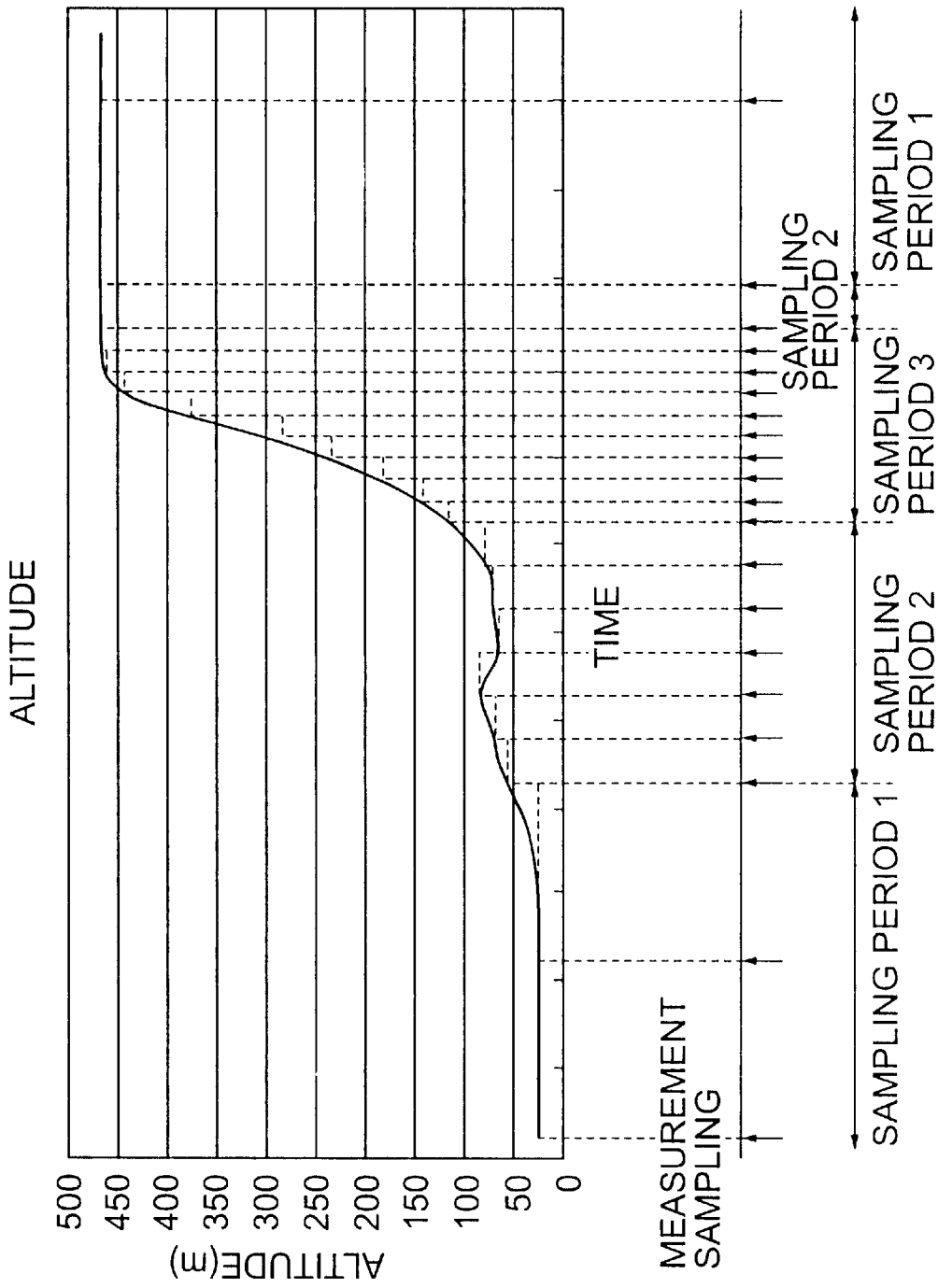
FIG. 6 is a diagram showing an example of a sampling period of the portable pressure measuring apparatus according to the third embodiment, correspondingly to an altitude.
Figure 7:
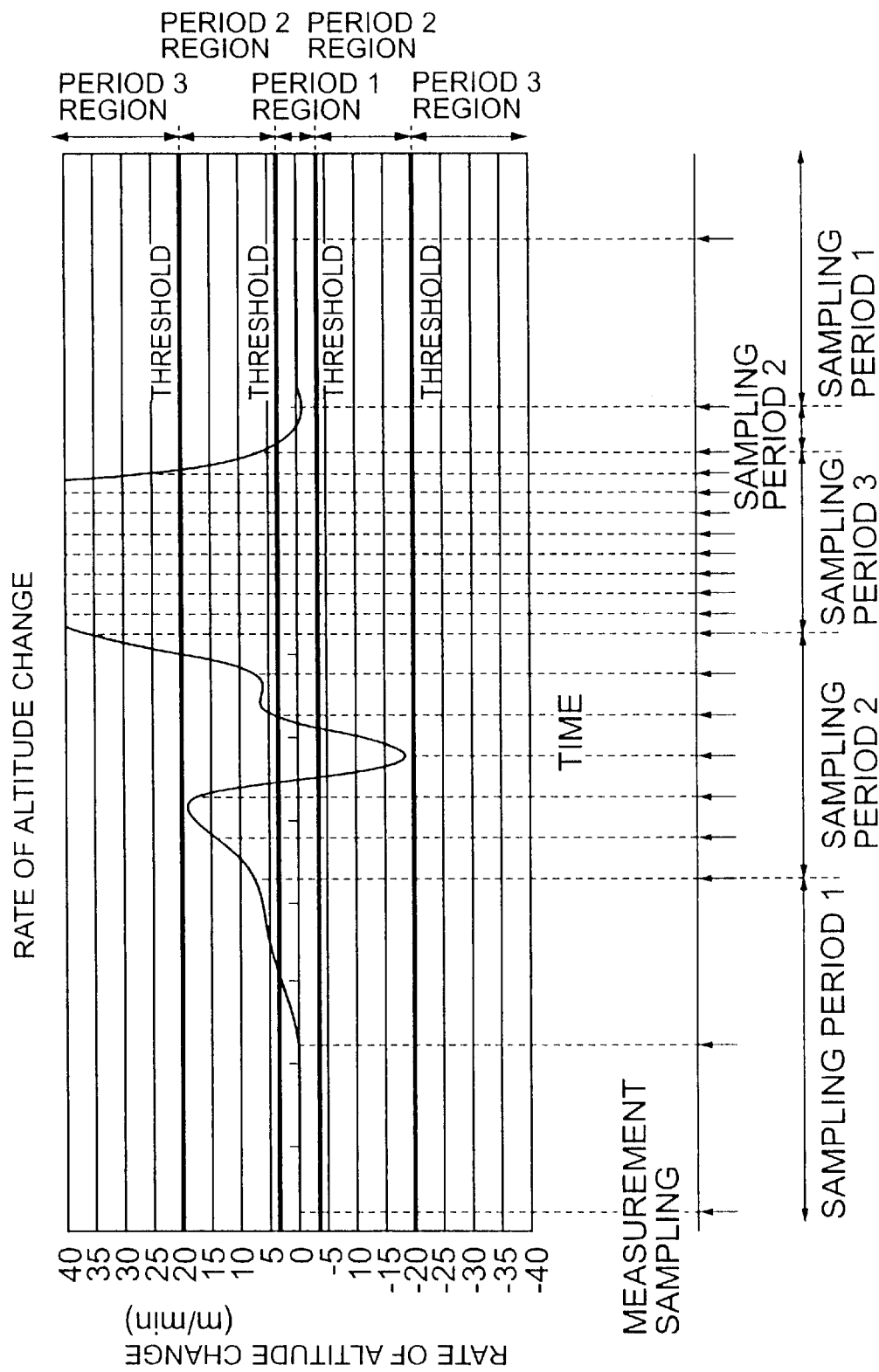
FIG. 7 is a diagram showing an example of a sampling period of the portable pressure measuring apparatus according to the third embodiment, correspondingly to a rate of altitude change.

For example, in FIG. 6 and FIG. 7 showing a case in which a user of the portable pressure measuring apparatus according to the third embodiment moves from a level ground at approx. 30 m altitude to an upland at approx. 460 m altitude, the pressure is measured in the sampling period 1 which is the maximum period if an absolute value of ΔALT is small and the threshold is smaller than 1. If the absolute value of ΔALT is extremely high and the threshold is 2 or greater, the pressure is measured in the sampling period 3 which is the minimum period. Then, if the absolute value of ΔALT is moderate and the threshold is equal to 1 or greater and smaller than the threshold 2, the pressure is measured in the sampling period 2, namely, a predetermined period between the sampling period 1 and the sampling period 3.

The ΔALT threshold depends upon a use of the portable pressure measuring apparatus according to the third embodiment, more specifically, a use in skydiving, skiing, mountain climbing, or scuba diving. For example, in the examples shown in FIG. 6 and FIG. 7, the threshold 1 of ΔALT is ±4 m/min. at the rate of altitude change and the threshold 2 is ±20 m/min.

The sampling period determined correspondingly to thresholds also depends upon a use of the portable pressure measuring apparatus according to the third embodiment, more specifically, a use in skydiving, skiing, mountain climbing, and scuba diving. For example, in the examples shown in FIG. 6 and FIG. 7, the sampling period 1 is 5 min., the sampling period 2 is 5 sec., and the sampling period 3 is 1 sec.

As set forth hereinabove, the portable pressure measuring apparatus according to the third embodiment has been described for a case in which N is 3. In the portable pressure measuring apparatus according to the third embodiment, however, 4 or 5 may be selected as the sampling period N depending upon a use of the portable pressure measuring apparatus according to the third embodiment.

(Fourth Embodiment)

Figure 3:
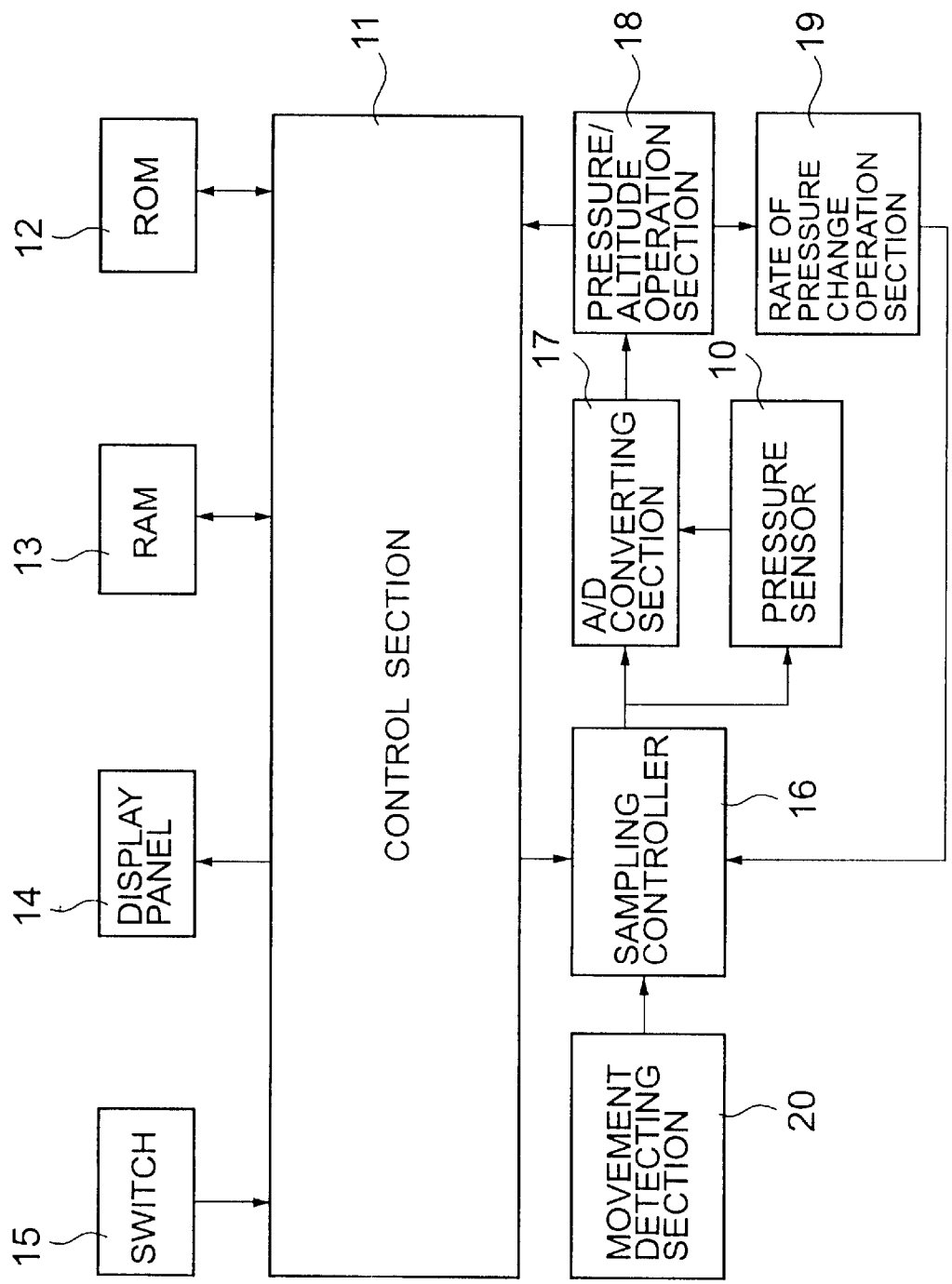
FIG. 3 is a block diagram of a portable pressure measuring apparatus according to a fourth embodiment and a fifth embodiment of the present invention.
Figure 15:
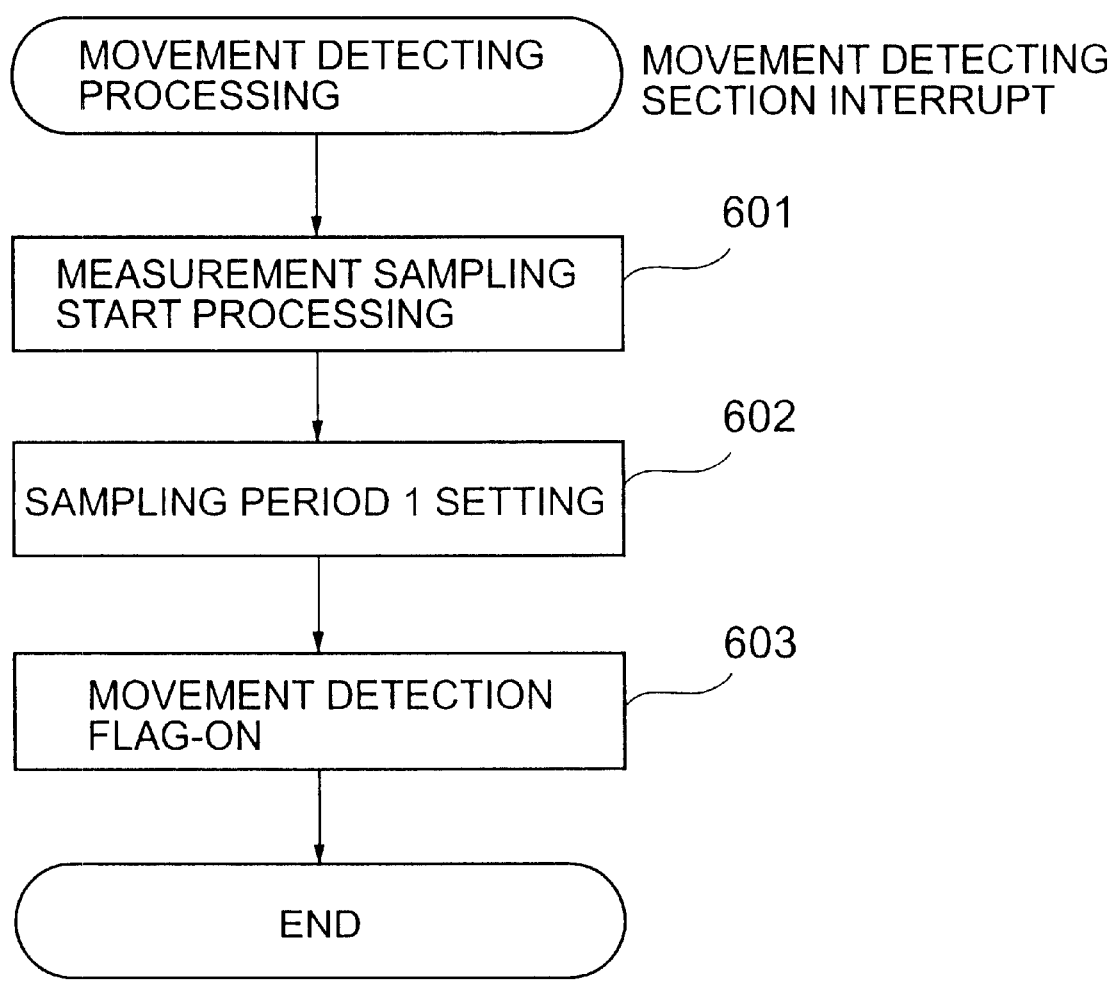
FIG. 15 is a diagram showing an example of a flowchart of movement detecting processing in the portable pressure measuring apparatus according to the fourth embodiment.
Figure 16:
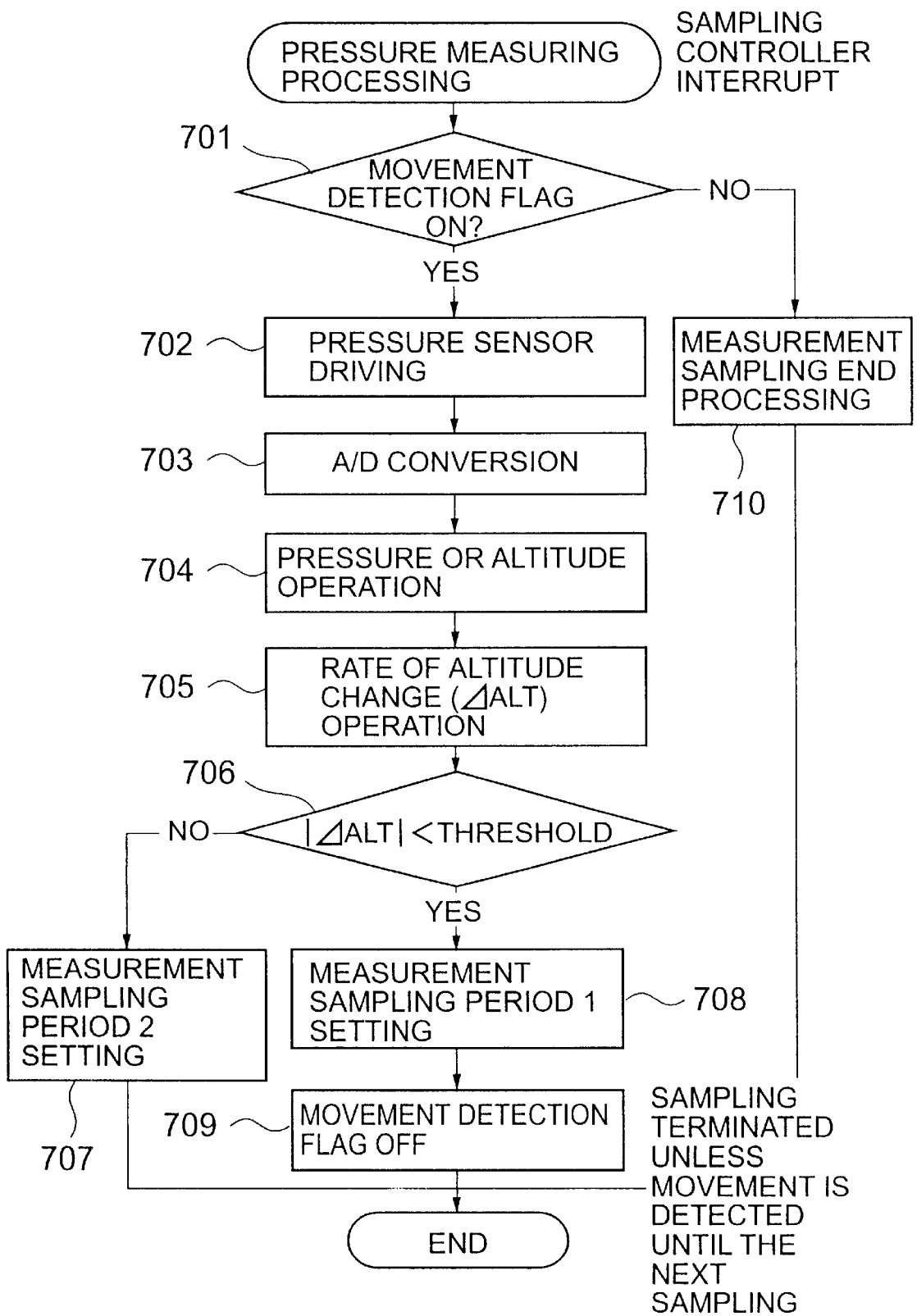
FIG. 16 is a diagram showing an example of a flowchart of pressure measuring processing in the portable pressure measuring apparatus according to the fourth embodiment.

A portable pressure measuring apparatus according to a fourth embodiment of the present invention, as shown in FIG. 3, comprises a pressure sensor 10, a control section 11 for performing various controls and arithmetic operations, a ROM 12 in which control programs are stored, a RAM 13 for storing various data, a display panel 14 for displaying an altitude or the like, switches 15 for various settings, a sampling controller 16 for driving the pressure sensor 10 in a predetermined sampling period, an A/D converting section 17 for converting an analog signal of the pressure sensor 10 to a digital signal, a pressure/altitude operation section 18 for obtaining an altitude from a measured pressure by an arithmetic operation, a rate of pressure change operation section 19, and a movement detecting section 20 wherein a pressure is measured in accordance with flowcharts as shown in FIG. 15 and FIG. 16.

In other words, the movement detecting processing program in FIG. 15 is started upon a movement detecting section interrupt made by the movement detecting section 20. Then, the control section 11 performs processing of measurement sampling start processing (601), sampling period 1 setting (602), and movement detection flag-on (603) in order and then terminates the movement detecting processing program. The sampling period 1 is, for example, 1 min.

The pressure measuring processing program in FIG. 11 is started upon a sampling controller interrupt made by the sampling controller 16. Then, the control section 11 determines whether the movement detection flag is on (701). If a result of the determination is YES in step 701, the control section 11 causes the program to perform processing of pressure sensor driving (702), an A/D conversion (703), a pressure/altitude operation (704), and a ΔALT operation (705) in order. A value of the ΔALT operation is obtained from the previous measurement and the current measurement.

Subsequent to step 705, the control section 11 determines whether the ΔALT absolute value is smaller than a threshold (706). If a result of the determination in step 706 is YES, the control section 11 causes the sampling controller 16 to perform the measurement sampling period 1 setting (708) processing and subsequently to perform movement detection flag-off (709) processing, in other words, unless a movement is detected until the next sampling the sampling is terminated.

If the result of the determination in step 706 is NO, the control section 11 causes the sampling controller 16 to perform the measurement sampling period 2 setting (707) processing and then the pressure measuring processing program is terminated.

A portable pressure measuring apparatus according to the fourth embodiment of the present invention comprises movement detection means, rate of altitude change operation means, and means for setting N–1 thresholds from the maximum threshold to the minimum threshold, wherein, if the movement detection means detects a movement, a pressure is measured in the Nth sampling period which is the minimum period if the rate of altitude change exceeds the maximum threshold, in the 1st sampling period which is the maximum period if the rate of altitude change is equal to or smaller than the minimum threshold, or in a sampling period having a length corresponding to respective thresholds if the rate of altitude change is between the maximum threshold and the minimum threshold and wherein unless the movement detection means detects a movement a pressure sampling measurement is not performed. In the above embodiment, the sampling period N is assumed to be 2.

Figure 8:
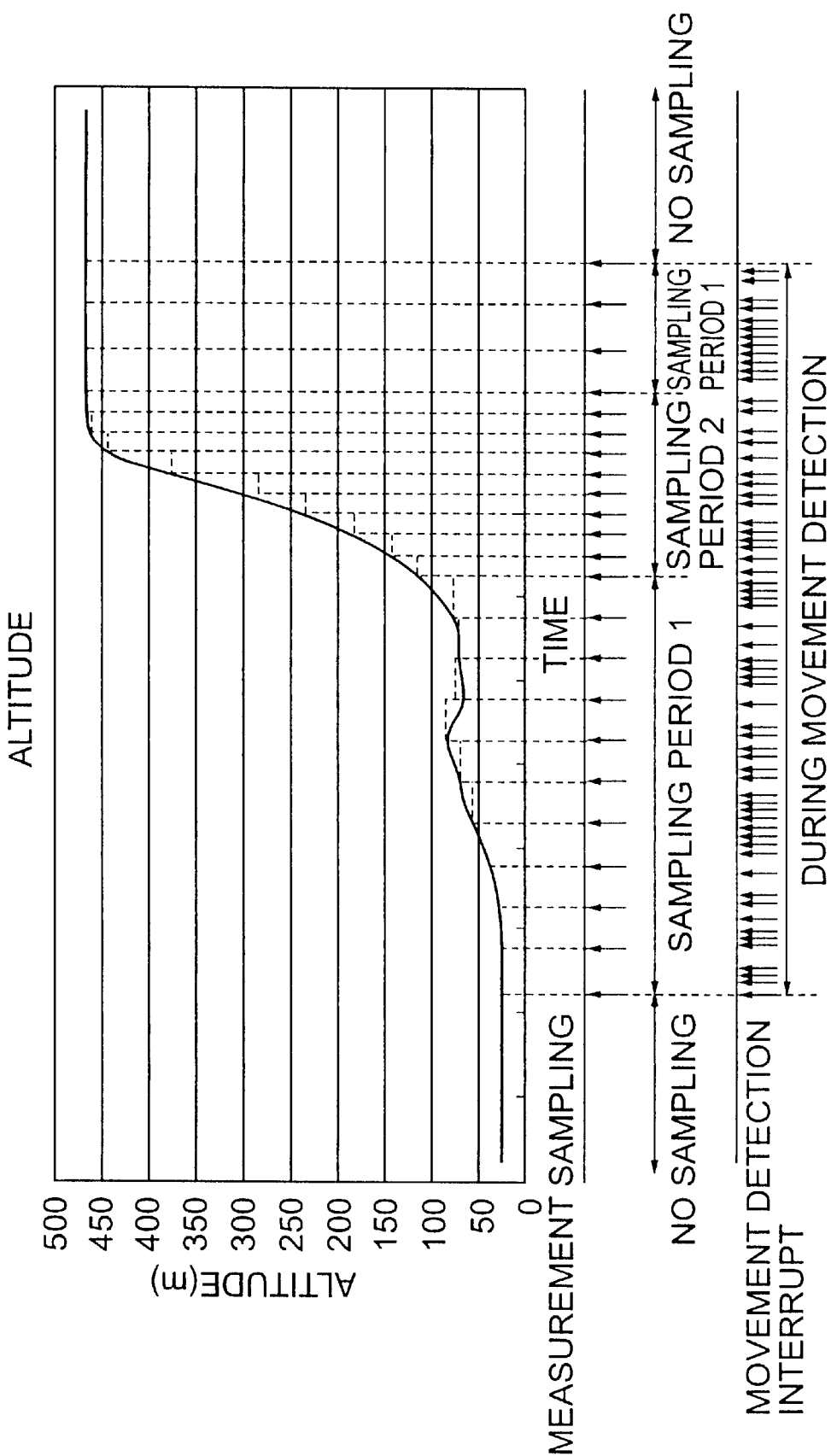
FIG. 8 is a diagram showing an example of a sampling period of the portable pressure measuring apparatus according to the fourth embodiment, correspondingly to an altitude.
Figure 9:
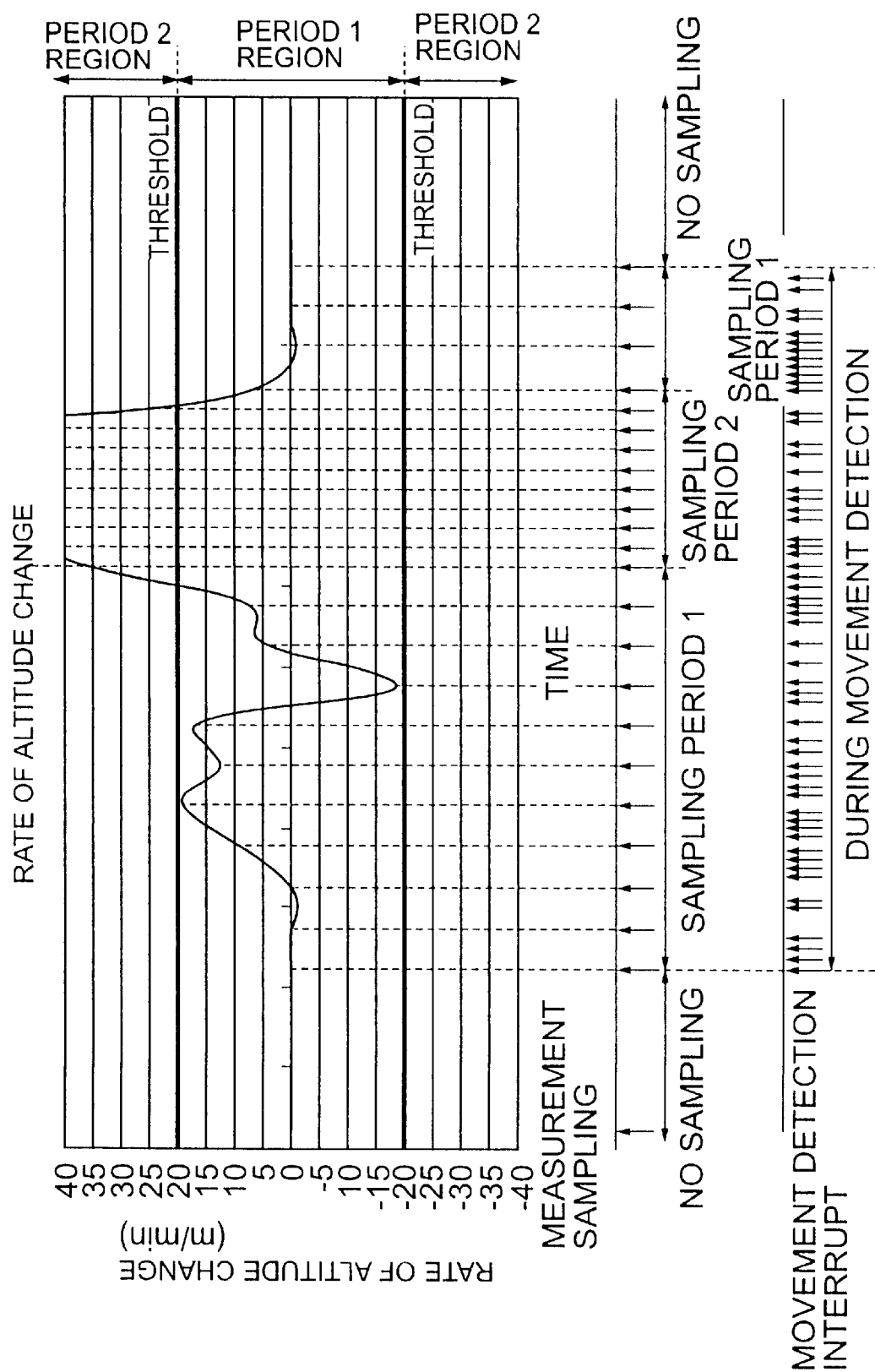
FIG. 9 is a diagram showing an example of a sampling period of the portable pressure measuring apparatus according to the fourth embodiment, correspondingly to a rate of altitude change.

For example, in FIG. 8 and FIG. 9 showing a case in which a user of the portable pressure measuring apparatus according to the fourth embodiment moves from a level ground at approx. 30 m altitude to an upland at approx. 460 m altitude, a pressure is not measured at all before the user begins to move, while a pressure measurement is started in the sampling period 1 upon a movement detecting section interrupt made by the movement detecting section 20.

Then, the processing from steps 601 to 603 of the flowchart in FIG. 15 and from steps 702 to 708 of the flowchart in FIG. 16 is repeated during moving.

During moving, if the absolute value of ΔALT is so small as to be below the threshold, the pressure is measured in the sampling period 1 which is the maximum period. If the absolute value of ΔALT is so large as to be equal to or more than the threshold, the pressure is measured in the sampling period 2 which is the minimum period. If the movement is not detected any more, the movement detection flag becomes off, thereby the control section 11 detects it and terminates the pressure measurement.

In the portable pressure measuring apparatus according to the fourth embodiment, the threshold of ΔALT is ±20 m/min., the sampling period 1 is 5 sec., and the sampling period 2 is 1 sec.

Also in the portable pressure measuring apparatus according to the fourth embodiment, 3, 4, 5, or the like is selected as the sampling period N depending upon a use of it.

(Fifth Embodiment)

A portable pressure measuring apparatus according to a fifth embodiment of the present invention comprises the same components as for the portable pressure measuring apparatus according to the fourth embodiment as shown in FIG. 3, wherein a pressure is measured in sampling periods as shown in FIG. 8 and FIG. 9 if the movement detecting section 20 detects a movement or in the non-movement sampling period unless the movement detecting section 20 detects any movement.

More specifically, the portable pressure measuring apparatus according to the fifth embodiment, in which a pressure is measured with sampling and an altitude is displayed in real time, comprises movement detection means, rate of altitude change operation means, and means for setting N–1 thresholds from the maximum threshold to the minimum threshold, wherein, if the movement detection means detects a movement, a pressure is measured in the Nth sampling period which is the minimum period if the rate of altitude change is equal to or greater than the maximum threshold, in the 1st sampling period which is the maximum period if the rate of altitude change is smaller than the minimum threshold, or in a sampling period having a length corresponding to respective thresholds if the rate of altitude change is between the maximum threshold and the minimum threshold and wherein, unless the movement detection means detects any movement, a movement a pressure is measured in the non-movement sampling period longer than the maximum period; the embodiment in which the sampling period N is assumed to be 2 is quite the same as for the portable pressure measuring apparatus according to the fourth embodiment within a range of processing during movement.

If the sampling period N is assumed to be 2, the second sampling period is 1 sec., the first sampling period 5 sec., and the non-movement sampling period is 30 min., for example.

Also in the portable pressure measuring apparatus according to the fifth embodiment, 3, 4, 5, or the like is selected as the sampling period N depending upon a use of the apparatus.

According to the present invention, there has been provided a portable pressure measuring apparatus concurrently satisfying two requirements of a real-time altitude display depending upon a use of the apparatus and low power consumption.

Furthermore, an optimum sampling period can be set in accordance with a rate of altitude change, thereby providing a portable pressure measuring apparatus applicable to various uses.

What is claimed is:

1. A portable pressure measuring apparatus comprising:
   measurement means for taking measurement samples of an external pressure;
   a display for displaying an altitude value on a real-time basis;
   movement detection means for detecting movement; and
   control means for controlling the measurement means to take measurement samples based on an output of the movement detection means;
   wherein the control means controls the measurement means to sample the external pressure in a movement sampling period for real-time display thereof if the movement detection means detects movement and to take no samples when the movement detection means detects no movement.

2. A portable pressure measuring apparatus comprising:
   measurement means for taking measurement samples of an external pressure;
   a display for displaying an altitude value on a real-time basis;
   movement detection means for detecting movement; and
   control means for controlling the measurement means to take measurement samples based on an output of the movement detection means;
   wherein the control means controls the measurement means to sample the external pressure in a movement sampling period for real-time display thereof if the movement detection means detects movement and in a non-movement sampling period which is longer than the movement sampling period when the movement detection means does not detect movement.

3. A portable pressure measuring apparatus comprising:
   measurement means for taking measurement samples of an external pressure;
   a display for displaying an altitude value on a real-time basis;
   rate of altitude change operation means for calculating a rate of change of the altitude value;
   control means for controlling the measurement means to take measurement samples based on an output of the movement detection means; and means for setting N−1 thresholds ranging from a maximum threshold to a minimum threshold;

wherein the control means controls the measurement means to take measurement samples in an Nth sampling period if the rate of altitude change is equal to or greater than a maximum one of the threshold values, in the 1st sampling period if the rate of altitude change is smaller than a minimum one of the threshold values, or in a respective other one of the N−1 sampling periods if the rate of altitude change is between the maximum threshold and the minimum threshold values.

4. A portable pressure measuring apparatus according to claim 3, wherein the value of N is 3.

5. A portable pressure measuring apparatus comprising:

measurement means for taking measurements samples of an external pressure;

a display for displaying an altitude value on a real-time basis;

movement detection means for detecting movement;

rate of altitude change operation means for calculating a rate of change of the altitude value;

control means for controlling the measurement means to take measurement samples based on an output of the movement detection means; and means for setting N−1 thresholds from a maximum threshold to a minimum threshold;

wherein the control means controls the measurement means such that if the movement detection means detects movement, the external pressure is measured in an Nth sampling period if the rate of altitude change is equal to or greater than a maximum one of the threshold values, in the 1st sampling period if the rate of altitude change is smaller than a minimum one of the threshold values, or in a respective one of the N−1 sampling periods if the rate of altitude change is between the maximum threshold value and the minimum threshold value and wherein, unless the movement detection means detects movement, a pressure sampling measurement is not performed.

6. A portable pressure measuring apparatus according to claim 5; wherein the value of N is 2.

7. A portable pressure measuring apparatus comprising:

measurement means for taking measurement samples of an external pressure;

a display for displaying an altitude value on a real-time basis;

movement detection means for detecting movement;

rate of altitude change operation means for calculating a rate of change of the altitude value;

control means for controlling the measurement means to take measurement samples based on an output of the movement detection means; and means for setting N−1 thresholds from a maximum threshold value to a minimum threshold value;

wherein the control means controls the measurement means such that if the movement detection means detects movement, the external pressure is measured in an Nth sampling period if the rate of altitude change is equal to or greater than a maximum one of the threshold values, in a 1st sampling period if the rate of altitude change is smaller than a minimum one of the threshold values, or in a respective one of the N−1 sampling periods if the rate of altitude change is between the maximum threshold value and the minimum threshold value and wherein, unless the movement detection means detects movement, the external pressure is measured in a non-movement sampling period which is longer than the 1st sampling period.

8. A portable pressure measuring apparatus according to claim 7, wherein the value of N is 2.

9. A portable pressure measuring apparatus according to claim 1; further comprising altitude calculating means for calculating the altitude based on the measured external pressure.

10. A portable pressure measuring apparatus according to claim 2; further comprising altitude calculating means for calculating the altitude based on the measured external pressure.

11. A pressure measuring apparatus comprising: a housing; a pressure sensor contained in the housing for sensing a pressure external of the housing and outputting a corresponding signal; a display contained in the housing for displaying one of an altitude and a depth value calculated based on the sensed external pressure; a movement detector contained in the housing for detecting movement of the housing; and a CPU for sampling the output signal of the pressure sensor based on an output of the movement detector such that measurement samples are taken in a movement sampling period if the movement detector indicates movement and in a different sampling period when the movement detector detects no movement.

12. A pressure measuring apparatus according to claim 11; wherein the CPU determines a rate of change of the altitude value, sets N−1 threshold values ranging from a maximum threshold value to a minimum threshold value, conducts sampling in an Nth sampling period if the rate of altitude change is equal to or greater than a maximum one of the threshold values, in a 1st sampling period if the rate of altitude change is smaller than a minimum one of the threshold values, or in one of the other N−1 sampling periods if the rate of altitude change is between the maximum threshold and the minimum threshold values.

13. A pressure measuring apparatus according to claim 11; wherein the CPU determines a rate of change of the altitude value, and sets a sampling rate for sampling the external pressure based on the rate of change of the altitude value such that the sampling rate is increased when the rate of change of the altitude value increases and decreased when the rate of change of the altitude value decreases.

* * * * *